(12) United States Patent
Wiedemann et al.

(10) Patent No.: US 7,202,454 B2
(45) Date of Patent: Apr. 10, 2007

(54) METHOD AND DEVICE FOR DETERMINATION OF THE TIME OF TURNING OF A COOKING PRODUCT

(75) Inventors: Peter Wiedemann, Klosterlechfeld (DE); Klaus Altenburger, Waldbronn (DE); Helen Podestat, Eichstetten (DE)

(73) Assignee: Rational AG, Landsberg/Lech (DE)

( * ) Notice: Subject to any disclaimer, the term of this patent is extended or adjusted under 35 U.S.C. 154(b) by 0 days.

(21) Appl. No.: 11/345,411

(22) Filed: Feb. 1, 2006

(65) Prior Publication Data

US 2006/0185523 A1 Aug. 24, 2006

(30) Foreign Application Priority Data

Feb. 2, 2005 (EP) ................... 05290243

(51) Int. Cl.
- H05B 6/68 (2006.01)
- A01K 43/00 (2006.01)
- A47J 37/06 (2006.01)

(52) U.S. Cl. ............ 219/702; 219/710; 219/712; 219/719; 219/494; 99/451; 99/325; 426/523; 426/241

(58) Field of Classification Search ........ 219/702–705, 219/710–713, 719, 494; 99/451, 325; 426/523–524, 426/241, 243

See application file for complete search history.

(56) References Cited

U.S. PATENT DOCUMENTS

| | | | |
|---|---|---|---|
| 3,373,611 A | 3/1968 | Trott | |
| 4,230,731 A | 10/1980 | Tyler | |
| 4,447,693 A | 5/1984 | Buck | |
| 6,753,027 B1 | 6/2004 | Greiner et al. | |
| 2002/0063127 A1* | 5/2002 | Jung | 219/703 |
| 2003/0007544 A1 | 1/2003 | Chang et al. | |

FOREIGN PATENT DOCUMENTS

| | | |
|---|---|---|
| DE | 299 23 215 | 8/2000 |
| DE | 100 62 371 A1 | 6/2002 |
| WO | WO-01/70087 | 9/2001 |
| WO | WO-03/031876 | 4/2003 |

OTHER PUBLICATIONS

European Search Report issued in EP 05 290 243.4 dated Jul. 14, 2005.

* cited by examiner

*Primary Examiner*—Philip H. Leung
(74) *Attorney, Agent, or Firm*—Marshall, Gerstein & Borun LLP

(57) ABSTRACT

A method for the determination of a turning time of at least one cooking product, to which heat is supplied from one side during a cooking process includes a) determination of a first temperature $T_A$ in the cooking product at the beginning of the cooking process at an initial time point $t_A$ as well as of a set temperature $T_E$ of the cooking product which must exist at the end of the cooking process at the end time $t_E$; b) acquiring of a first temperature difference between the set temperature $T_{set}$ and the first temperature $T_A$; c) determination of at least one actual temperature $T_{actual}$ in the cooking product at several times during the cooking process; d) acquiring of the time of turning $t_T$ as the time at which a second temperature difference between the set temperature $T_{set}$ and the actual temperature $T_{actual}$ reaches a certain fraction of the first temperature difference; and e) outputting a signal when the time of turning $t_T$ is reached.

32 Claims, 1 Drawing Sheet

METHOD AND DEVICE FOR DETERMINATION OF THE TIME OF TURNING OF A COOKING PRODUCT

RELATED APPLICATIONS

This application claims priority to European application number EP 05 290 243.4 filed on Feb. 2, 2005.

TECHNICAL FIELD

The application concerns a method for the determination of the time of turning of a cooking product and a cooking device for such a method.

BACKGROUND ART

A cooking device is known from WO 03/031876 A1 which has a temperature sensor, a processor and an output unit. For example, using the output unit the user of the cooking device can obtain acoustic or visual instructions, especially for turning, rotating, rolling, stirring, mixing or separating a cooking product, namely as a function of a temperature, which is measured with a temperature sensor, a time period or an applied amount of heat.

In WO 01/70087 A2 a method and a device are described for automatic cooking, in which the state of cooking of a cooking product is determined using the core temperature. Especially, in the device of WO 01/70087 A2 an indicator can be present which indicates when the core temperature of the cooking product has reached a predetermined temperature. Furthermore, the device has an installation for turning the cooking product.

DE 299 23 215 U1 discloses a temperature sensor with several temperature sensors which can measure the temperature in and on a cooking product. The time course of the temperatures measured at the temperature sensors can be used to determine a core temperature. Among others, this core temperature can be used for the determination of the cross-section of a cooking product or similar.

Of course the known cooking devices have the disadvantage that the time of turning a cooking product is not recognized correctly automatically, so that uniform browning of a cooking product, when heat is introduced to the cooking product only on one side by contact heating, is not realized repeatedly to the desired extent. Especially, in the cooking device of WO 03/031876 A1 the shape and/or the thickness of the cooking product introduced into the cooking device is not taken into consideration, so that in the programming of such a cooking device only an average size of the cooking product and/or of the cooking product thickness is assumed. Consequently, too long cooking of a non-standard sized cooking product, that is, one which corresponds to an average size on only one side, can lead to a completely unpalatable result and/or to a different browning on the two sides of the cooking product, which finally leads to an unsatisfied client and/or to an increased financial expenditure because of the repeated cooking attempt. In order to avoid this, an operator of the said cooking device until now was forced to remain continuously near the cooking device in order to turn the cooking product at the correct time based on his experience. This is also costly.

SUMMARY OF THE DISCLOSURE

Therefore, the task of the present disclosure is to provide a method for the determination of the time of turning of a cooking product which overcomes the disadvantages of the state of the art, especially uniform browning when reaching a desired target temperature of the cooking product on both sides of the cooking product.

This task is solved by a method for the determination of the time of turning of at least one cooking product, to which heat is supplied on one side during the cooking process, involving the following steps:

a) determination of a first temperature $T_A$ in the cooking product at the beginning of the cooking process at an initial time point $t_A$ as well as of a set temperature $T_{set}$ of the cooking product which must exist at the end of the cooking process at the end time $t_E$;

b) acquiring of a first temperature difference between the set temperature $T_{set}$ and the first temperature $T_A$;

c) determination of at least one actual temperature $T_{actual}$ in the cooking product at several times during the cooking process;

d) acquiring of the time of turning $T_T$ as the time at which a second temperature difference between the set temperature $T_{set}$ and the actual temperature $T_{actual}$ reaches a certain fraction of the first temperature difference; and outputting a signal when the time of turning $t_T$ is reached.

Hereby it can be provided that at least during step c) heat is supplied on one side to the cooking product by contact heating, preferably with the aid of a pan bottom.

Furthermore, it is proposed that the fraction of the second temperature difference to the time of turning $t_T$, that is $(T_{set}-T_T)$ where $T_T$=turning temperature, is selected from a range from 30% to 70% of the first temperature difference $(T_{set}-T_A)$, especially as a function of the cooking product, determined, preferably, by the type of cooking product, the cooking product thickness, the shape of the cooking product and/or the cooking product caliber.

Hereby it is preferred that the first temperature $T_A$ and/or the actual temperature $T_{actual}$ be determined using at least one temperature sensor, especially a core temperature sensor which is introduced into the cooking product at least partly, and/or using a contactless measurement method, especially with infrared sensors.

Furthermore, it can be provided that the first temperature $T_A$ is measured or is entered by an operator, especially with the aid of an input device, or queried from a memory device after insertion of the temperature sensor into the cooking product, after introduction of the cooking product into a cooking device and/or before supplying of heat to the cooking product be measured or be entered by an operator, especially via an input device, or queried from a memory device.

Furthermore, it is proposed that the set temperature $T_{set}$ is entered by an operator, especially with the aid of an input device, or the set temperature $T_{set}$ is queried from a memory device.

Moreover, it can also be provided that the end core temperature of the cooking product at the end time $t_E$ is selected as the set temperature $T_{set}$ and/or the actual temperature of the cooking product at each time point be selected as the actual temperature $T_{actual}$ and/or the initial core temperature of the cooking product at the beginning time $t_A$ is selected as the first temperature $T_A$.

Furthermore, it can be provided that the actual temperature $T_{actual}$ and/or the initial temperature $T_A$ is/are determined with a temperature sensor with a plurality of measuring points along it tips which can be inserted into the cooking product at least partially, especially through evaluation of the temperatures detected at the measuring points as a function of time.

Thus, it is proposed that first measuring points, at which changing measured values are detected starting from the initial time $t_A$, are considered as measuring points arranged in the cooking product and are used for the determination of the actual temperature $T_{actual}$ and/or of the initial temperature $T_A$ and/or the second measuring points, at which, after the starting time $t_A$, measured values are determined which remain substantially unchanged as a function of time, are considered measuring points arranged outside the cooking product.

It can also be provided that based on the rate of increase of the actual temperature $T_{actual}$ in the cooking product, especially as a function of the amount of heat supplied to the cooking product through at least one heating device from one side, preferably determined by a pan bottom temperature, the caliber, the thickness and/or the shape of the cooking product is/are determined.

Furthermore, it is proposed that the signal is output as an optical, acoustic and/or sensible signal for an operator.

It can also be provided that the signal is received by at least one turning device, especially in the form of an optical, electrical and/or electromagnetic signal, and the turning device turns the cooking product.

A cooking device for performing a procedure as described above is also provided, comprising at least one control and/or regulating device, at least one temperature measuring device, at least one signal device and at least one heating device.

Hereby it can be provided that the cooking device comprises a pan, especially an open pan into which at least one cooking product can be introduced.

Furthermore, it is proposed that heat can be supplied to the cooking product to one side through a pan bottom to which heat is admitted by a heating device, whereby the heating device preferably comprises at least one heating element, at least one means for inductive heating, at least one resistance heater, at least one microwave heating device and/or at least one gas heating device.

Furthermore, it can be provided that the temperature measuring device comprises a core temperature sensor with a plurality of measuring sensors along its tip that can be introduced at least partially into the cooking product and/or at least one temperature sensor in the region of the pan bottom, preferably insulated from the heating device.

The cooking devices described herein can be characterized by at least one turning device for the cooking product.

Thus, the invention is based on the surprising finding that after acquiring of a first temperature difference between a set temperature of a cooking product, preferably the desired end core temperature thereof, and a first temperature at the beginning of a cooking process in the cooking product, especially in the form of a first temperature measured directly after introduction of a temperature sensor into the cooking product and/or introduction of the cooking product into a cooking device, and/or a first determined temperature predetermined by an operator when, for example, the cooking product is removed from a (deep) freezer directly, then it is ensured that an operator or a turning device will turn the cooking product at the correct time without the operator monitoring the cooking product during the complete cooking time, as a result of which at the same time when the set temperature is reached, both sides of the cooking product will be uniformly browned by outputting a turning signal when a second temperature difference between the set temperature and a temperature measured in the cooking product as a function of time has reached a certain value between 30% to 70% of the first temperature difference to be overcome. The accurate fraction depends on the cooking product, and it is, for example, 50% in the case of a steak.

The disclosed method for the determination of the time of turning of a cooking product results in the fact that the operation of the cooking device is not only simplified but also the operator of the cooking device does not have to monitor the cooking process constantly. Furthermore, through the cooking method described herein and through the cooking device described herein it becomes possible that even untrained persons who do not have long experience in the evaluation of turning times can be operators. As a result of this, the operation of the cooking can be optimized much better and unpalatable cooking results are completely avoided, which consequently leads to a smaller amount of cooking product that must be disposed of before consumption, and thus to a significant savings in cost.

BRIEF DESCRIPTION OF THE DRAWINGS

Other characteristics and advantages of the invention follow from the description which is given below in which an embodiment of the invention is explained in detail with the aid of schematic drawings. The following are shown.

DETAILED DESCRIPTION

Figure 1:
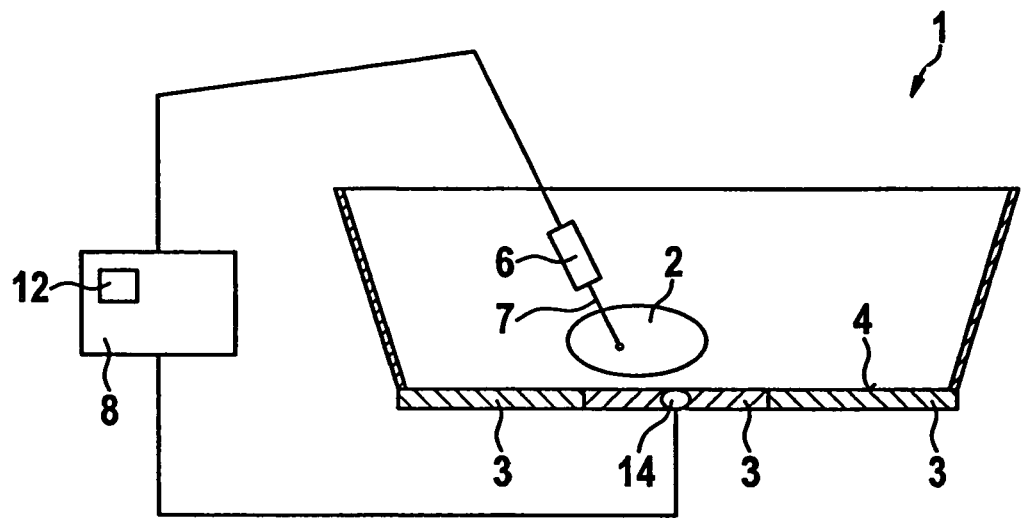
FIG. 1 is a cooking device according to the invention.
Figure 2:
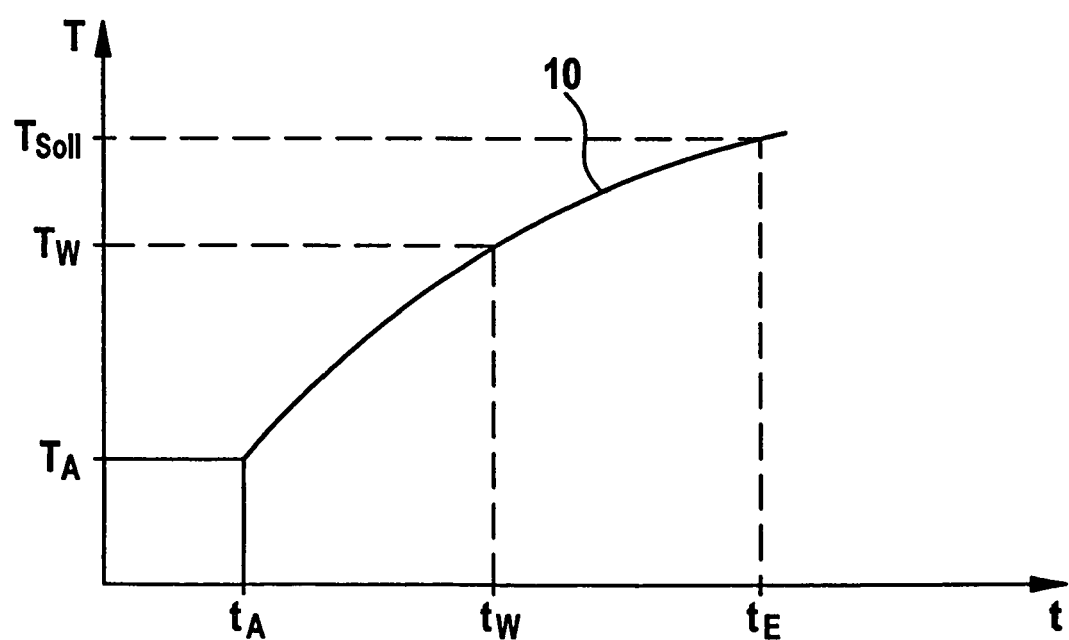
FIG. 2 is a time-temperature diagram of a temperature course in a cooking product being cooked in a cooking device according to FIG. 1.

If in a cooking device in the form of an open cooking pan 1 as can be seen in FIG. 1, heat is supplied to a food or to a cooking product (2) by contact heating from only one side, for example, via heating elements 3, which are arranged at the bottom 4 of the cooking pan 1, then, with the aid of a core temperature sensor 6, at least partially introduced into the cooking product 2 in the region of its tip 7, the sensor being in contact with a control and/or regulating device 8, the time point $t_t$ is determined at which the cooking product 2 must be turned in order to reach a desired set core temperature $T_{set}$ simultaneously with obtaining uniform browning on both sides of it. FIG. 2 shows a time-temperature diagram with a time axis (t-axis) and a temperature axis (T-axis). The solid line 10 indicates the actual temperature $T_{actual}$ in the cooking product 2 acquired by core temperature sensor 6. In order to obtain uniform browning on both sides of the cooking product 2, first of all a first temperature difference between a set temperature $T_{set}$, for example set by the operator of cooking pan 1, which is supposed to be present at the end of the cooking process, that is, at the endpoint $t_E$, as the desired target temperature, and an initial temperature $T_A$ measured at the beginning of a cooking process, that is, at the initial time directly after the insertion or sticking of the core temperature sensor into the cooking product, this initial temperature representing the lowest temperature during the cooking process, that is, $(T_{set}-T_A)$, is determined. During the supplying of heat via the heating elements 3, the actual temperature 10 increases, especially in the form of the actual core temperature $T_{actual}$ in cooking product 2 during the course of the cooking process. When the actual temperature $T_{actual}$ 10, depending on cooking product 2, has increased such that the temperature difference $T_{set}-T_{actual}$ reaches a value between 30% to 70%, for example 50%, of the first temperature difference to be overcome, the so-called turning temperature $T_T$ in cooking product 2 at turning time $t_T$ occurs. When, then, for example, $(T_{set}-T_T)=40\% (T_{set}-T_A)$, it is indicated to an operator by a signal, especially with the aid of signal device 12, that now he must turn cooking product 2 located in cooking pan 1. After turning cooking product 2, that is, after turning time $t_T$, the cooking process is continued until reaching the desired set temperature $T_{set}$, which is reached at the end time $t_E$.

In addition, through evaluation of the rate of increase of the actual temperature 10 in cooking product 2, that is, of the core temperature in cooking product 2 during the cooking process, in the control and/or regulating device 8, the thickness of the cooking product 2 can be determined, especially as a function of the pan bottom temperature, which is in connection with the control and/or regulating unit 8 through a temperature sensor 14 arranged in bottom 4.

For example, in the determination of the core temperature of cooking product 2 with the aid of core temperature sensor 6, which has a number of measuring points along its tip 7, one can take into consideration that the temperature in the surroundings of the cooking product 2 shows only a slight temperature change during the cooking process in an open or closed pan 1 with the temperature being increased through contact heating, such as with the aid of a heating element 3. Now, if, immediately after insertion of the core temperature sensor 6 into the cooking product, a rapid temperature change is observed at the first measuring points by the control and/or regulating unit 8 through evaluation of the output values at the measuring points of the core temperature 6, then only the output values of these are used for the determination of the core temperature, while the temperatures at the remaining measuring points are considered as lying outside the cooking product, not changing or changing only slowly. For example, if there are three closely-lying, that is neighboring, measuring points of the core temperature sensor 6 in cooking product 2, and the temperature difference between a first measuring point and the neighboring second measuring point, as well as between the second measuring point and the third measuring point which is neighboring it again, are above a defined third temperature difference, it is concluded from that that all three measuring points are located in the cooking product 2. The coldest point in cooking product 2, that is, the core temperature of cooking product 2 can be determined through a mathematical formula with consideration of the time course of the temperature at the measuring points, and thus the quality of the insertion, that is, the distance of the measuring points in the cooking product 2 from the core of cooking product 2 can also be determined. Finally, the core temperature can be used, for example, for the determination of the final cooking state, at which the end core temperature corresponds to the target core temperature.

Naturally, instead of the core-temperature sensor 6 described above, a contactless method can also be used, for example with infrared sensors, for the measurement or determination of $T_A$ and/or $T_{actual}$.

The characteristics of the invention disclosed in the above specification, the drawings and the claims can be essential individually as well as in any arbitrary combination for the realization of the invention in its different embodiments.

REFERENCE LIST

1 Cooking pan
2 Cooking product
3 Heating element
4 Bottom
6 Core temperature sensor
7 Tip
8 Control and/or regulating unit
10 Actual temperature
12 Signal device
14 Temperature sensor
T Temperature
$T_{set}$ Set temperature
$T_T$ Turning temperature
$T_A$ Initial temperature
$t_A$ Initial
t Time
$t_T$ Turning time
$t_E$ End time

The invention claimed is:

1. Method for the determination of a time of turning of at least one cooking product, to which heat is supplied from one side during a cooking process, comprising:
   a) determining a first temperature $T_A$ in the cooking product at the beginning of the cooking process at an initial time point $t_A$ as well as of a set temperature $T_{set}$ of the cooking product which must exist at the end of the cooking process at an end time $t_E$;
   b) acquiring a first temperature difference between the set temperature $T_{set}$ and the first temperature $T_A$;
   c) determining at least one actual temperature $T_{actual}$ in the cooking product at several times during the cooking process;
   d) acquiring the time of turning $T_T$ as the time at which a second temperature difference between the set temperature $T_{set}$ and the actual temperature $T_{actual}$ reaches a predetermined fraction of the first temperature difference; and
   e) outputting a signal when the time of turning $t_T$ is reached.

2. Method according to claim 1, wherein at least during step c) heat is supplied from one side to the cooking product by contact heating.

3. Method according to claim 2, wherein heat is introduced to the cooking through a bottom of a pan.

4. Method according to claim 1, wherein the fraction of the second temperature difference at the time of turning $t_T$, that is ($T_{set}-T_T$), where $T_T$=turning temperature, is selected from a range from 30% to 70% of the first temperature difference ($T_{set}-T_A$).

5. Method according to claim 4, wherein the fraction of the second temperature difference at the time of turning $t_T$ is selected from 30% to 70% of the first temperature difference as a function of the cooking product.

6. Method according to claim 5, wherein the function of the cooking product is one or more of the type of cooking product, the cooking product thickness, the shape of the cooking product and/or the cooking product caliber.

7. Method according to claim 1, wherein the first temperature $T_A$ and/or the actual temperature $T_{actual}$ is determined using at least one temperature sensor.

8. Method according to claim 7, wherein the temperature sensor is a core temperature sensor which is introduced at least partly into the cooking product.

9. Method according to claim 7, wherein the first temperature $T_A$ and/or the actual temperature $T_{actual}$ is determined using a contactless temperature measurement method.

10. Method according to claim 9, wherein the contactless temperature measurement method uses one or more infrared sensors.

11. Method according to claim 1, wherein the first temperature $T_A$ is measured or is entered by an operator, or queried from a memory device after insertion of the temperature sensor into the cooking product, after introduction of the cooking product into a cooking device and/or before supplying of heat to the cooking product.

12. Method according to claim 11, wherein the first temperature $T_A$ is entered by an operator with the aid of an input device.

13. Method according to claim 1, wherein the set temperature $T_{set}$ is entered by an operator or queried from a memory device.

14. Method according to claim 13, wherein the set temperature $T_{set}$ is entered by an operator with the aid of an input device.

15. Method according to claim 1, wherein the end core temperature of the cooking product at the end time $t_E$ is selected as the set temperature $T_{set}$, and/or the actual core temperature of the cooking product at all times is selected as the actual temperature $T_{actual}$, and/or the initial core temperature of the cooking product at the beginning time $t_A$ is selected as the first temperature $T_A$.

16. Method according to claim 1, wherein the actual temperature $T_{actual}$ and/or the initial temperature $T_A$ is/are determined with a temperature sensor having a plurality of measuring points along a tip that can be inserted into the cooking product at least partially.

17. Method according to claim 16, wherein the actual temperature $T_{actual}$ and/or the initial temperature $T_A$ is/are determined through evaluation of the temperatures detected at the measuring points of the temperature sensor as a function of time.

18. Method according to claim 16, wherein the first measuring points, at which changing measured values are detected starting from the initial time $t_A$, are considered as measuring points arranged in the cooking product, and are used for the determination of the actual temperature $T_{actual}$ and/or of the initial temperature $T_A$, and/or the second measuring points, at which, after the starting time $t_A$, measured values are determined which substantially remain unchanged as a function of time, are considered as measuring points arranged outside the cooking product.

19. Method according to claim 1, wherein based on the rate of increase of the actual temperature $T_{actual}$ in the cooking product, the caliber, the thickness and/or the shape of the cooking product is/are determined.

20. Method according to claim 19, wherein the rate of increase of the actual temperature $T_{actual}$ in the cooking product is determined as a function of the amount of heat introduced to the cooking product through at least one heating device from one side.

21. Method according to claim 20, wherein the rate of increase of the actual temperature $T_{actual}$ in the cooking product is determined by a pan bottom temperature.

22. Method according to claim 1, wherein the signal is output as an optical, an acoustic and/or a sensible signal for an operator.

23. Method according to claim 1, wherein the signal is received by at least one turning device and the cooking device turns the cooking product.

24. Method according to claim 23, wherein the signal is in the form of an optical, an electrical and/or an electromagnetic signal.

25. Cooking device for performing a method of determining a time of turning for at least one cooking product, comprising:
   at least one control and/or regulation device,
   at least one temperature measuring device,
   at least one signal device, and
   at least one heating device;
   wherein the at least one control and/or regulation device
      (a) determines a first temperature $T_A$ in the cooking product at the beginning of a cooking process at an initial time point $t_A$ as well as a set temperature $T_{set}$ of the cooking product which must exist at the end of the cooking process at an end time $t_E$;
      (b) acquires a first temperature difference between the set temperature $T_{set}$ and the first temperature $T_A$;
      (c) determines at least one actual temperature $T_{actual}$ in the cooking product at several times during the cooking process;
      (d) acquires the time of turning $T_T$ as the time at which a second temperature difference between the set temperature $T_{set}$ and the actual temperature $T_{actual}$ reaches a predetermined fraction of the first temperature difference; and
      (e) outputs a signal when the time of turning $t_T$ is reached.

26. Cooking device according to claim 25, wherein the cooking device further comprises a pan into which the at least one cooking product can be introduced.

27. Cooking device according to claim 26, wherein the pan is an open pan.

28. Cooking device according to claim 26, wherein heat can be supplied to the at least one cooking product to one side through a pan bottom to which heat is admitted by a heating device.

29. Cooking device according to claim 28, wherein the heating device comprises one or more of a heating element, a means for inductive heating, a resistance heater, a microwave heating device and/or a gas heating device.

30. Cooking device according to claim 26, wherein the temperature measuring device comprises a core temperature sensor with a plurality of measuring sensors along a tip that can be introduced at least partially into the cooking product, and/or at least one temperature sensor in a region of a pan bottom of the pan into which the at least one cooking product is introduced.

31. Cooking device according to claim 30, wherein the at least one temperature sensor in the region of the pan bottom is insulated from the heating device.

32. Cooking device according claim 25, further comprising at least one turning device for the cooking product.

* * * * *